(12) United States Patent
Lim et al.

(10) Patent No.: US 10,591,784 B2
(45) Date of Patent: Mar. 17, 2020

(54) LIQUID CRYSTAL DISPLAY DEVICE

(71) Applicant: LG Display Co., Ltd., Seoul (KR)

(72) Inventors: Jong-Hoon Lim, Seoul (KR); Do-Yeon Kim, Busan (KR); Tae-Rim Lee, Seongnam-si (KR); Sung-Won Lee, Paju-si (KR); Sun-Yoon Kim, Jeonju-si (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 15/406,216

(22) Filed: Jan. 13, 2017

(65) Prior Publication Data
US 2018/0120655 A1 May 3, 2018

(30) Foreign Application Priority Data

Oct. 31, 2016 (KR) .................. 10-2016-0143759

(51) Int. Cl.
*G02F 1/1343* (2006.01)
*G02F 1/1333* (2006.01)
*G02F 1/1337* (2006.01)
*G02F 1/1368* (2006.01)

(52) U.S. Cl.
CPC ...... *G02F 1/134363* (2013.01); *G02F 1/1337* (2013.01); *G02F 1/1368* (2013.01); *G02F 1/13439* (2013.01); *G02F 1/133345* (2013.01); *G02F 1/134309* (2013.01); *G02F 2001/133397* (2013.01); *G02F 2001/134372* (2013.01); *G02F 2201/121* (2013.01); *G02F 2201/123* (2013.01); *G02F 2202/06* (2013.01);
(Continued)

(58) Field of Classification Search
CPC ......... G02F 1/134363; G02F 1/133707; G02F 1/1337; G02F 1/134309; G02F 1/13439; G02F 1/1368; G02F 2001/134372; G02F 2001/133397; G02F 2201/121; G02F 2201/123; G02F 2203/01; G02F 2202/06; G02F 2202/10; G02F 2202/16
USPC ........................................................ 349/141
See application file for complete search history.

(56) References Cited

U.S. PATENT DOCUMENTS

2006/0139537 A1* 6/2006 Park ................. G02F 1/133711
349/123
2010/0134710 A1 6/2010 Ishitani et al.
(Continued)

FOREIGN PATENT DOCUMENTS

KR 10-2013-0036681 A 4/2013

OTHER PUBLICATIONS

European Patent Office, Search Report and Opinion, European Patent Application No. 16207037.9, dated Aug. 11, 2017, eleven pages.

*Primary Examiner* — Nathanael R Briggs
*Assistant Examiner* — William D Peterson
(74) *Attorney, Agent, or Firm* — Fenwick & West LLP

(57) ABSTRACT

A liquid crystal display device includes a first substrate; a thin film transistor on the first substrate; a first passivation layer on the thin film transistor; a first electrode on the first passivation layer; a second passivation layer on the first electrode; a second electrode of an oxide semiconductor on the second passivation layer; and an alignment layer on the second electrode. The second electrode includes first portions and second conductive portions alternating with the first portions. A surface of the first portions is flush with the second conductive portions.

21 Claims, 11 Drawing Sheets

(52) U.S. Cl.
CPC ...... *G02F 2202/10* (2013.01); *G02F 2202/16* (2013.01); *G02F 2203/01* (2013.01)

(56) References Cited

U.S. PATENT DOCUMENTS

| | | | |
|---|---|---|---|
| 2013/0001579 A1* | 1/2013 | Jung | H01L 27/088 |
| | | | 257/72 |
| 2018/0108780 A1* | 4/2018 | Li | H01L 21/02664 |
| 2018/0212061 A1* | 7/2018 | Xie | H01L 29/78648 |
| 2019/0027640 A1* | 1/2019 | Yamazaki | H01L 27/1225 |

* cited by examiner

LIQUID CRYSTAL DISPLAY DEVICE

CROSS-REFERENCE TO RELATED APPLICATION

The present application claims priority from and the benefit under 35 U.S.C § 119(a) of Korean Patent Application No. 10-2016-0143759, filed in the Republic of Korea on Oct. 31, 2016, which is hereby incorporated by reference in their entirety.

BACKGROUND

Field of the Disclosure

The present disclosure relates to a liquid crystal display device, and more particularly, to a liquid crystal display device capable of effectively improving light leakage and afterimage.

Discussion of the Related Art

In general, liquid crystal display (LCD) devices are driven based on optical anisotropy and polarization characteristics of liquid crystal. Liquid crystal molecules have a long and thin shape, and the liquid crystal molecules are regularly arranged along in an alignment direction. The alignment of the liquid crystal molecules depends on the intensity or the direction of an electric field applied to the liquid crystal molecules.

By controlling the alignment of the liquid crystal molecules, light is refracted along the alignment of the liquid crystal molecules, thereby displaying images.

Since the LCD device including thin film transistors as a switching element, referred to as an active matrix LCD (AM-LCD) device, has excellent characteristics of high resolution and displaying moving images, the AM-LCD device has been widely used.

The LCD device includes two substrates, which are spaced apart and facing each other, and a liquid crystal layer is interposed between the two substrates. Each of the substrates includes an electrode. The electrodes from respective substrates face one another. A vertical electric field is induced between the electrodes in a direction perpendicular to the substrates by applying a voltage to each electrode. The LCD device driven by the vertical electric field has relatively high transmittance and aperture ratio.

In addition, an in-plane switching (IPS) mode LCD device, in which electrodes are formed on one substrate, has been suggested and developed.

Generally, the IPS mode LCD device includes an array substrate including thin film transistors, a color filter substrate including color filters, and a liquid crystal layer between the array substrate and the color filter substrate. The IPS mode LCD device controls light transmittance of the liquid crystal layer with a dielectric anisotropy using an electric field to display images.

The array substrate includes the thin film transistor, a pixel electrode and a common electrode in each of pixel regions defined by crossing of gate lines and data lines. The thin film transistor supplies a data signal from the data line to the pixel electrode according to a gate signal from the gate line. The pixel electrode receives the data signal through the thin film transistor and drives liquid crystal molecules, and the common electrode receives a common voltage as a base for driving the liquid crystal molecules. The liquid crystal molecules rotate according to an electric field induced by the data signal of the pixel electrode and the common voltage of the common electrode and control the light transmittance to thereby achieve gray scales.

Recently, a fringe field switching (FFS) mode LCD device has been suggested to provide better viewing angle properties.

FIG. 1 is a schematic view of an FFS mode LCD device according to the related art.

In FIG. 1, the FFS mode LCD device 100 includes a gate line 43 in a first direction and a data line 51 in a second direction crossing the gate line 43 to define a pixel region P.

A thin film transistor Tr is disposed in the pixel region P and is connected to the gate line 43 and the data line 51. The thin film transistor Tr includes a gate electrode 45, a gate insulating layer (not shown), a semiconductor layer (not shown), a source electrode 55 and a drain electrode 58.

In addition, a common electrode 60 having a plate shape in the pixel region P is formed substantially all over a display area including the pixel region P. Here, the common electrode 60 is shown by a dotted line corresponding to the pixel region P.

Moreover, a pixel electrode 70 having a plurality of openings op is formed in the pixel region P. The pixel electrode 70 overlaps the common electrode 60. Each opening op has a bar shape.

In the FFS mode LCD device, voltages are applied to the common electrode 60 and the pixel electrode 70 in the pixel region P to induce a fringe field therebetween.

FIGS. 2A to 2F are schematic cross-sectional views of an FFS mode LCD device in steps of manufacturing the same and correspond to a line II-II of FIG. 1.

In FIG. 2A, the common electrode 60 is formed on a first substrate 11, and a passivation layer 80 is formed on the common electrode 60. A pixel electrode layer 72 is formed on the passivation layer 80.

Here, the common electrode 60 and the pixel electrode layer 72 are formed by depositing a transparent conductive material, for example, indium tin oxide (ITO).

In FIG. 2B, photoresist patterns 30 are formed on the pixel electrode layer 72 through a photolithographic process. The photoresist patterns 30 selectively expose the pixel electrode layer 72.

In FIG. 2C, the exposed portions of the pixel electrode layer 72 of FIG. 2B are removed by wet-etching.

In FIG. 2D, the pixel electrode 70 having openings OP is formed, and the photoresist pattern 30 of FIG. 2C is removed.

In FIG. 2E, an alignment layer 90 is formed on the pixel electrode 70.

In FIG. 2F, a second substrate 12 is attached to the first substrate 11 with liquid crystal molecules 98 between the first and second substrates 11 and 12 to thereby complete the FFS mode LCD device 100.

Here, the alignment layer 90 has a step height d due to the openings op of the pixel electrode 70.

Moreover, the passivation layer 80 under the pixel electrode 70 is partially removed during the wet etching step, and the passivation layer 80 has a first step height d1 of FIG. 2D. The pixel electrode 70 has a second step height d2 of FIG. 2D due to the openings op. Thus, the step height d of the alignment layer 90 is increased by the sum of the first and second step heights d1 and d2 of FIG. 2D.

The step height d of the alignment layer 90 between an area where the pixel electrode 70 is formed and an area where the pixel electrode 70 is not formed causes a problem when the liquid crystal molecules 98 are driven.

First, in a normally black mode, a voltage is not applied to the liquid crystal molecules 98, and black is displayed.

Namely, when a voltage is not applied, the liquid crystal molecules 90 are arranged in a rubbing direction of the alignment layer 90.

However, the alignment layer 90 is not perfectly rubbed due to the step height d, and some of the liquid crystal molecules 98 are not regularly arranged in the rubbing direction and distorted. In addition, the liquid crystal molecules 98 adjacent to the second substrate 12 are also irregularly arranged over the step height d.

Therefore, phase retardation of light is caused due to the liquid crystal molecules 98 irregularly arranged around and over the step height d of the alignment layer 90. Linearly polarized light is changed into elliptically polarized light by the phase retardation, and the elliptically polarized light is outputted through a polarizer on the second substrate 12.

As a result, in the normally black mode, when a voltage is not applied, there is a problem of light leakage.

Moreover, there is another problem of an afterimage that a previous image overlaps a new image because of poor response of the liquid crystal molecules 98 irregularly arranged around the step height d of the alignment layer 90.

These problems are caused in an IPS mode LCD device and a vertical alignment (VA) mode LCD device in addition to the FFS mode LCD device.

SUMMARY

Accordingly, one aspect of the present disclosure is to provide an LCD device that substantially obviates one or more of the problems due to limitations and disadvantages of the related art.

An objective of the present disclosure is to provide an LCD device that effectively improves light leakage and afterimage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present disclosure, as embodied and broadly described herein, there is provided a liquid crystal display device including a first substrate; a thin film transistor on the first substrate; a first passivation layer on the thin film transistor; a first electrode on the first passivation layer; a second passivation layer on the first electrode; a second electrode of an oxide semiconductor on the second passivation layer; and an alignment layer on the second electrode, wherein the second electrode includes first portions and second portions, and the second portions have a conductor property. A surface of the second portions of the second electrode is flush with a surface of the first portions of the second electrode.

In another aspect, a liquid crystal display device includes a first substrate; a thin film transistor on the first substrate; a passivation layer on the thin film transistor; an electrode layer of an oxide semiconductor on the passivation layer; and an alignment layer on the electrode layer, wherein the electrode layer includes a first conductive portion, a second conductive portion and a third portion disposed between the first and second conductive portions.

In another aspect, a liquid crystal display device includes a first substrate and a second substrate facing each other; a thin film transistor on an inner surface of the first substrate; a passivation layer on the thin film transistor; a first electrode of an oxide semiconductor on the passivation layer; a first alignment layer on the first electrode; a second electrode of an oxide semiconductor on an inner surface of the second substrate; a second alignment layer on the second electrode; and a liquid crystal layer between the first and second alignment layers, wherein each of the first and second electrodes includes conductive portions and insulating portions, and a surface of the conductive portions are flush to a surface of adjacent insulating portions.

In another embodiment, a liquid crystal display device comprises a first electrode on a substrate; an insulating layer disposed on the first electrode, and a second electrode disposed on the insulating layer. The second electrode comprises a plurality of first conductive portions, and a plurality of second portions. The second portions have a lower conductivity than the first conductive portions. The first conductive portions are alternately arranged with the second portions, and a surface of the first conductive portions are flush with a surface of the second portions. In some embodiments, the first conductive portions of the second electrode are formed of plasma treated oxide semiconductor. In some embodiment, the oxide semiconductor is indium gallium zinc oxide (IGZO), and the first conductive portions of the second electrode are formed of IGZO having an oxygen concentration higher than the second portions of the second electrode. In some embodiments, the first conductive portions of the second electrode are bar-shaped and spaced apart from each other separated by the second portions of the second electrode.

In still another embodiment, a method of manufacturing a device comprises depositing a transparent conductive layer on a substrate, depositing an insulating layer on the substrate, depositing a transparent semiconductor layer on the first substrate, depositing a photoresist on the transparent semiconducting layer, patterning the photoresist to have a plurality of openings, treating portions of the transparent semiconductor layer that are underneath the plurality of openings of the patterned photoresist to increase the conductivity of the treated portions, and removing the photoresist. In some embodiments, the transparent semiconductor layer includes oxide semiconductor, and treating portions of the transparent semiconductor layer comprises plasma treating the portions of the semiconductor layer that are underneath the plurality of openings of the patterned photoresist to increase the oxygen concentration of the treated semiconductor layer. In some embodiments, a surface of the transparent semiconductor layer is substantially flat.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiment of the disclosure, an example of which is illustrated in the accompanying drawings. Words of 'on' and 'under' are used only for describing a direction in the following explanations and thus are not limited to 'directly on' and 'directly under'.

Figure 3:
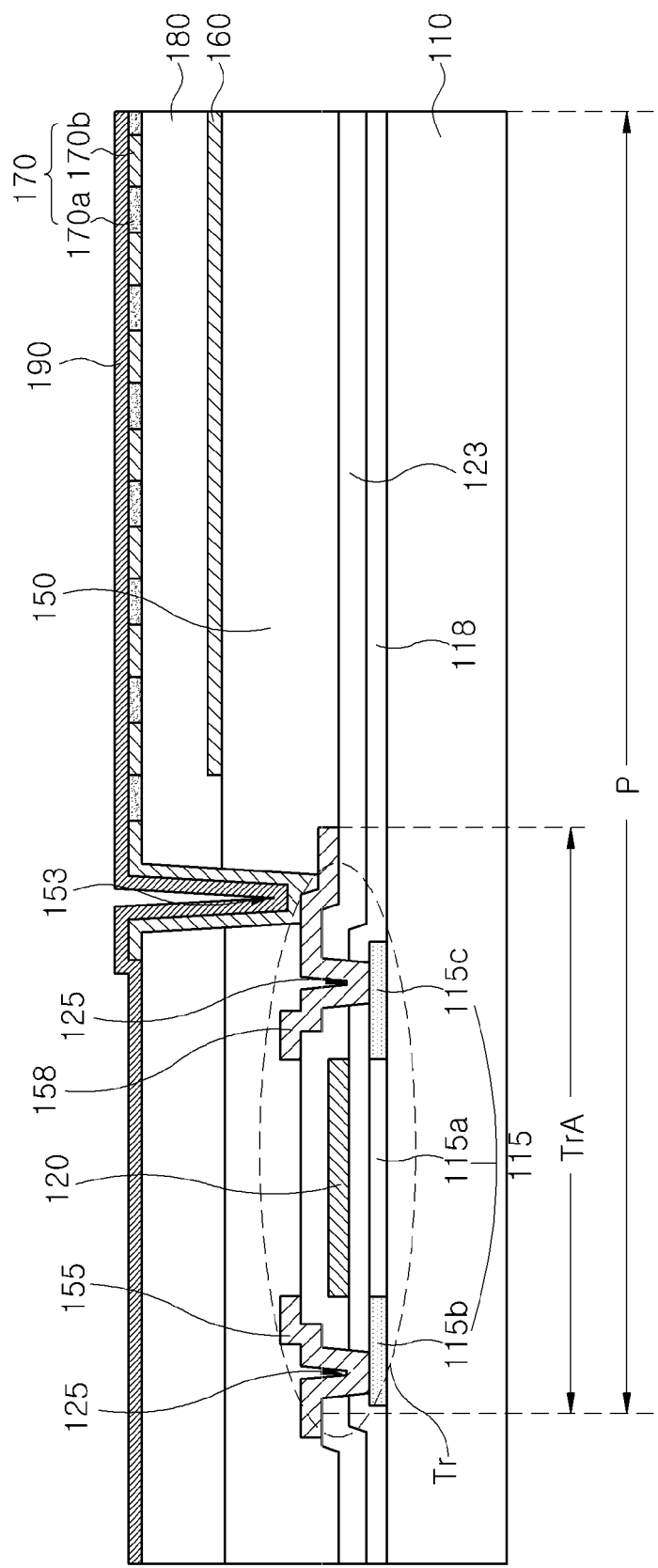
FIG. 3 is a schematic cross-sectional view of an array substrate of an LCD device according to a first embodiment.

FIG. 3 is a schematic cross-sectional view of an array substrate of an LCD device according to a first embodiment.

In FIG. 3, a semiconductor layer 115 is formed in a switching area TrA of each pixel region P on a first substrate 110. A gate insulating layer 118 is formed on the semiconductor layer 115, in some embodiments substantially all over the first substrate 110. A gate electrode 120 is formed on the gate insulating layer 118 corresponding to a central portion 115a of the semiconductor layer 115. The semiconductor layer 115 includes a source portion 115b at a first side of the central portion 115a, and a drain portion 115c at a second side of the central portion 115a. The source portion 115b and the drain portion 115c are highly doped with impurities.

An inter insulating layer 123 is formed on the gate electrode 120 and the gate insulating layer 118. The inter insulating layer 123 includes semiconductor contact holes 125 exposing the source and drain portions 115b and 115c, respectively.

Source electrode 155 and drain electrode 158 are formed on the inter insulating layer 123. The source and drain electrodes 155 and 158 are spaced apart from each other and are connected to the source and drain portions 115b and 115c, respectively, through the semiconductor contact holes 125.

The semiconductor layer 115, the gate insulating layer 118, the gate electrode 120, the source electrode 155, and the drain electrode 158 in the switching area TrA constitute a thin film transistor Tr.

Here, the thin film transistor Tr is explained as a coplanar type, which may be also referred to as a top gate type and the type of the thin film transistor Tr is not limited to this. Alternatively, an inverted staggered type thin film transistor, which may be also referred to as a bottom gate type, may be used.

A first passivation layer 150 and a second passivation layer 180 may be formed on the source and drain electrodes 155 and 158. The first and second passivation layers 150 and 180 may have a drain contact hole 153 exposing the drain electrode 158. A first electrode 160 may be disposed between the first and second passivation layers 150 and 180.

A second electrode 170 may be formed on the second passivation layer 180 and overlap the first electrode 160 in the pixel region P.

In the first embodiment, the second electrode 170 contacts the drain electrode 158 through the drain contact hole 153. Alternatively, the first electrode 160 may contact the drain electrode 158 through the drain contact hole 153. In this case, the first electrode 160 may be separately formed in each pixel region P, and the second electrode 170 in the pixel region P may be connected to a second electrode in a next pixel region.

A first alignment layer 190 is formed on the second electrode 170.

The second passivation layer 180 is disposed between the first electrode 160 and the second electrode 170. When a voltage is applied, a fringe field is generated between the first electrode 160 and the second electrode 170.

Like this, the LCD device including the array substrate according to the first embodiment may be a fringe field switching (FFS) mode.

Here, one of the first electrode 160 and the second electrode 170 may be a pixel electrode, and the other may be a common electrode. For example, the first electrode 160 may be a common electrode, and the second electrode 170 may be a pixel electrode.

The LCD device according to the first embodiment further includes a second substrate (not shown) spaced apart from and facing the first substrate 110. A black matrix (not shown) may be formed on an inner surface of the second substrate, and a color filter layer (not shown) including red, green and blue color filter patterns may be formed between patterns of the black matrix.

In addition, an overcoat layer (not shown) may be formed on the color filter layer. The overcoat layer has a flat top surface and protects the color filter layer. A second alignment layer (not shown) is formed on the overcoat layer.

The first substrate 110 and the second substrate are attached to each other with liquid crystal molecules (not shown) interposed therebetween.

The structure of the FFS mode LCD device illustrated herein is merely exemplary and is not limited to this.

In the FFS mode LCD device according to the first embodiment, the first electrode 160 and the second electrode 170 do not have specific patterns and have substantially a plate shape.

Figure 1:
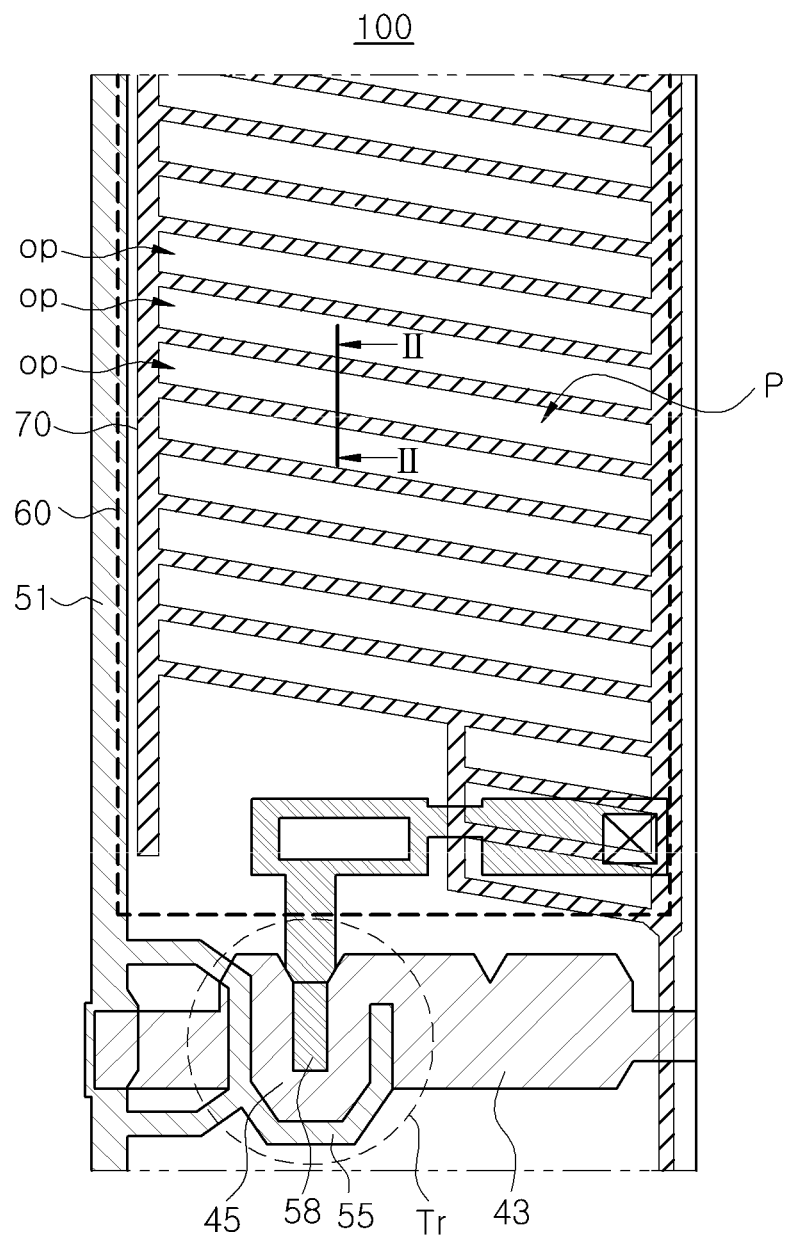
FIG. 1 is a schematic view of an FFS mode LCD device according to the related art.
Figure 2A:
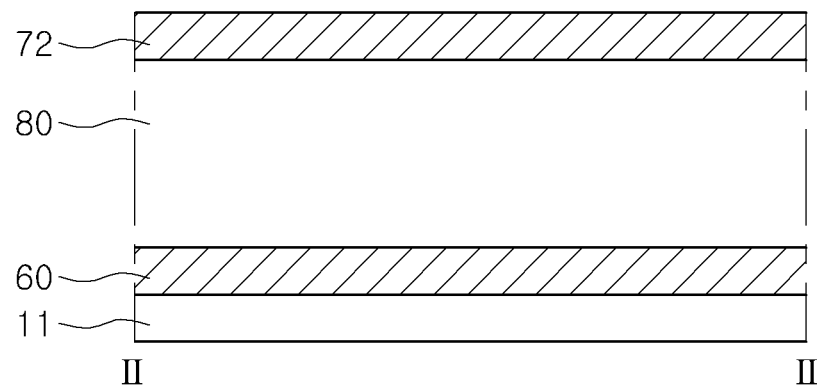
FIGS. 2A to 2F are schematic cross-sectional views of an FFS mode LCD device in steps of manufacturing the same and correspond to a line II-II of FIG. 1.
Figure 2B:
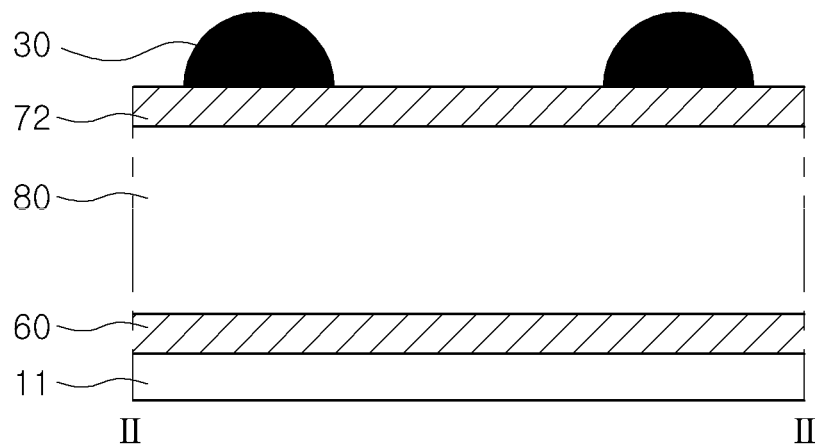
Figure 2C:
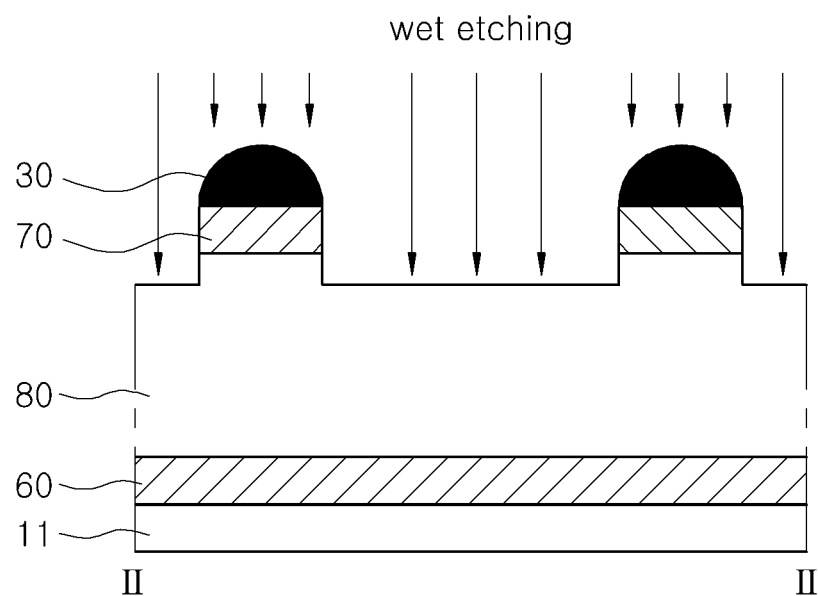
Figure 2D:
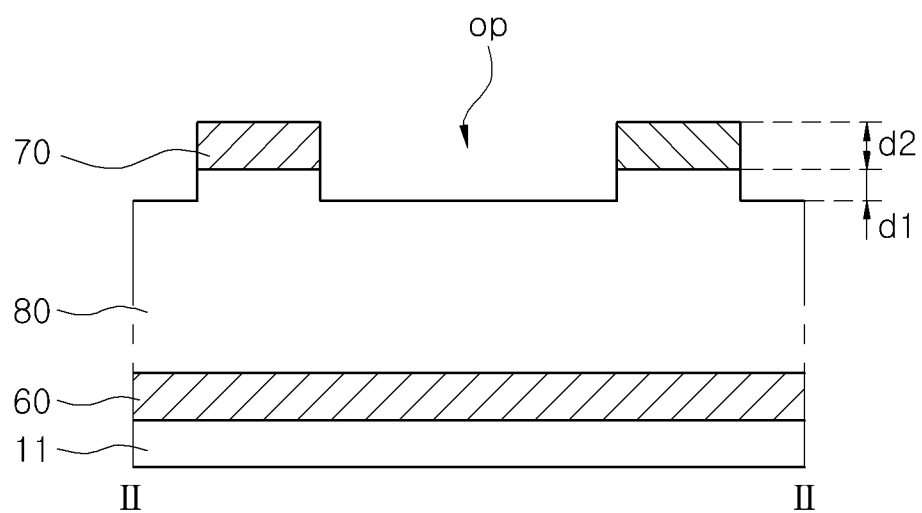
Figure 2E:
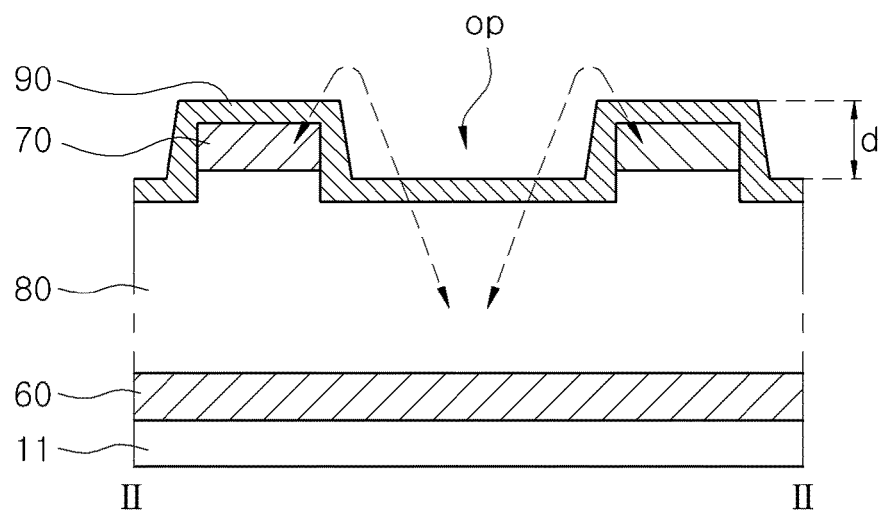
Figure 2F:
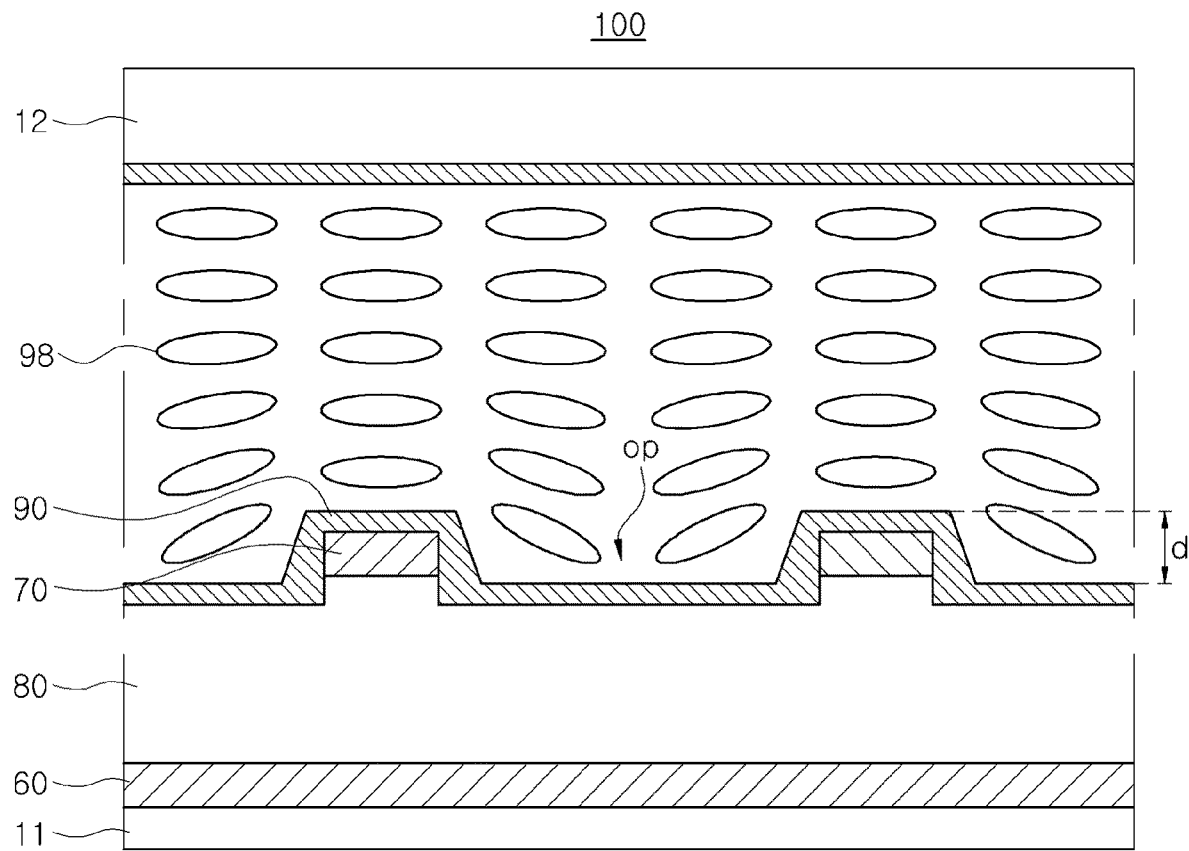

Namely, the second electrode 170 does not have any pattern such as openings, and thus the first alignment layer 190 on the second electrode 170 does not have a step height d as shown in FIG. 2E.

Therefore, the light leakage and afterimage, which are caused by the step height d of the alignment layer 90 due to the openings op of the second electrode 70 in FIG. 2E, can be effectively reduced or eliminated.

FIGS. 4A to 4F are schematic cross-sectional views of the LCD device in steps of manufacturing the same according to the first embodiment.

Figure 4A:
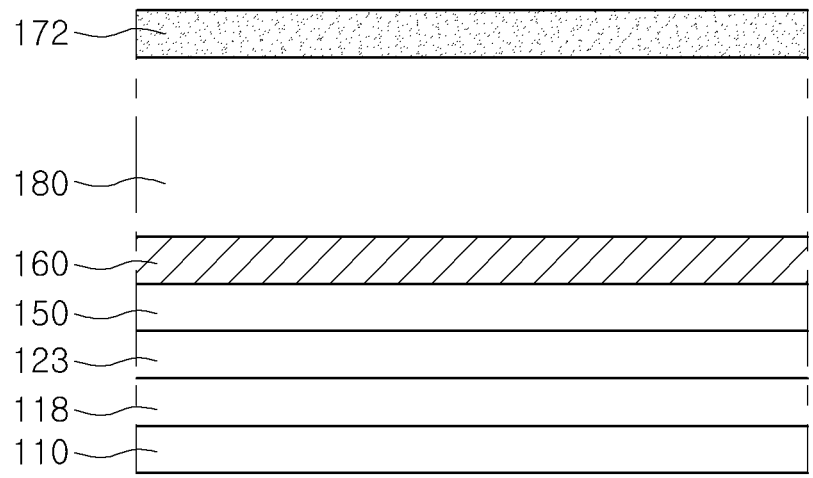
FIGS. 4A to 4F are schematic cross-sectional views of the LCD device in steps of manufacturing the same according to the first embodiment.

In FIG. 4A, the gate insulating layer 118, the inter insulating layer 123 and the first passivation layer 150 are sequentially formed on the first substrate 110. The first electrode 160 having a plate shape is formed on the first passivation layer 150, and the second passivation layer 180 is formed on the first electrode 160. A second electrode layer 172 is formed on the second passivation layer 180. The second electrode layer 172 may be separately patterned to correspond to each pixel region P of FIG. 3.

The first electrode 160 may be formed of a transparent conductive material. For example, the first electrode 160 may be formed of indium tin oxide (ITO).

In addition, the second passivation layer 180 on the first electrode 160 may be formed by depositing an inorganic insulating material such as silicon oxide ($SiO_2$) or silicon nitride (SiNx), for example, or by applying an organic insulating material such as photo acryl, for example.

The second electrode layer 172 may be formed of a transparent material such as indium gallium zinc oxide (IGZO).

The IGZO is an oxide semiconductor. The IGZO may include a 1:1:1:3 mix of indium, gallium, zinc and oxygen, and the IGZO is not limited to this.

The second electrode layer 172 may be formed on the second passivation layer 180 by depositing IGZO using a RF and DC magnetron sputtering method, a molecular beam epitaxy (MBE) method, a chemical vapor deposition (CVD) method, or a pulse laser deposition (PLD) method.

The sputtering method has the advantage that a film having a high quality can be easily formed at a relatively low temperature. Furthermore, it is easier to deposit a film for a relatively large area compared to other methods.

Figure 4B:
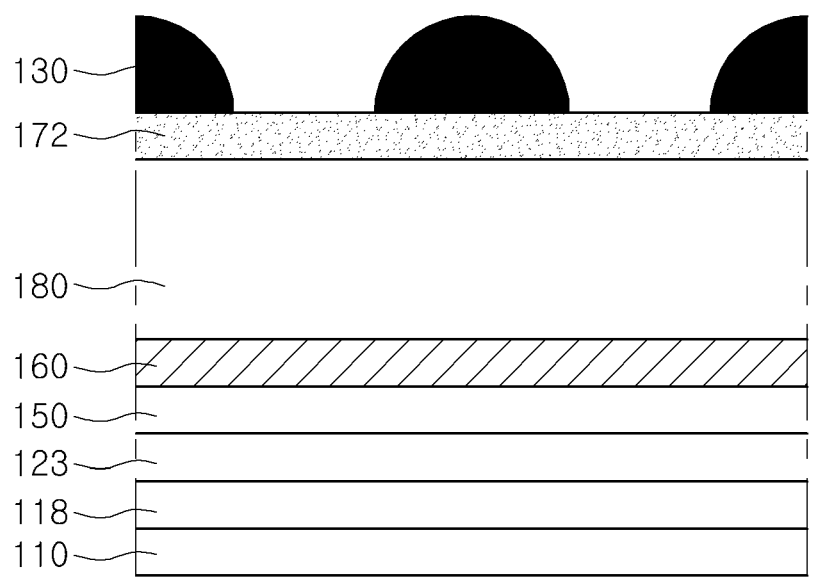

In FIG. 4B, a photoresist layer is formed on the second electrode layer 172 and is patterned through a photolithographic process to thereby form photoresist patterns 130 on the second electrode layer 172.

The photoresist patterns 130 selectively cover portions of the pixel electrode layer 172 and selectively expose the other portions of the pixel electrode layer 172.

Figure 4C:
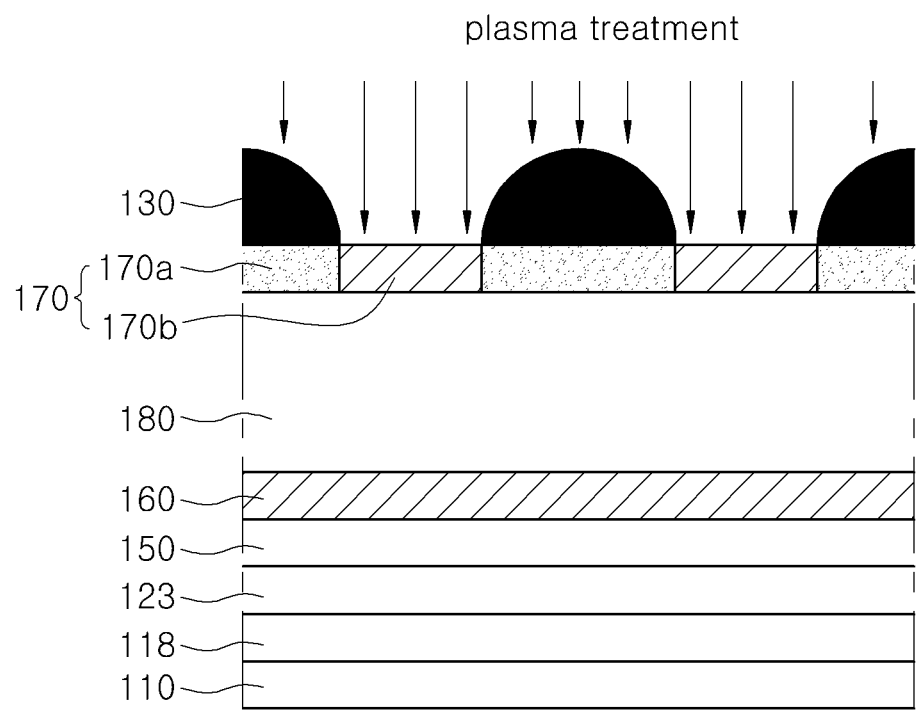

In FIG. 4C, plasma treatment is performed to the pixel electrode layer 172 of FIG. 4B such that the exposed portions of the pixel electrode layer 172 of FIG. 4B becomes a conductor, thereby forming the second electrode 170 including first portions 170a and second portions 170b.

In the second portions 170b of the second electrode 170 formed of IGZO, oxygen vacancies are formed by ion impacts through the plasma treatment, and the oxygen vacancies function as dopants. Thus, the resistance of the second portions 170b of the second electrode 170 decreases, and the second portions 170b of the second electrode 170 have a conductor property.

That is, the oxygen vacancies are generated during the plasma treatment process, the number of free electrons increases, and the conductivity of the second portions 170b of the second electrode 170 increases.

Argon (Ar), helium (He) or hydrogen (H2) may be used for the plasma treatment, and the gas for the plasma treatment is not limited to these.

The first portions 170a and the second portions 170b may have a bar shape and may alternate each other. However, the first and second portions 170a and 170b are not limited to this.

The photoresist patterns 130 may cover one of the first portions 170a and the second portions 170b expose the other of the first portions 170a and the second portions 170b.

For example, as shown in FIG. 4C, the photoresist patterns 130 cover the first portions 170a and expose the second portions 170b in one embodiment. Alternatively, the photoresist patterns 130 may cover the second portions 170b and expose the first portions 170a in other embodiments.

Figure 4D:
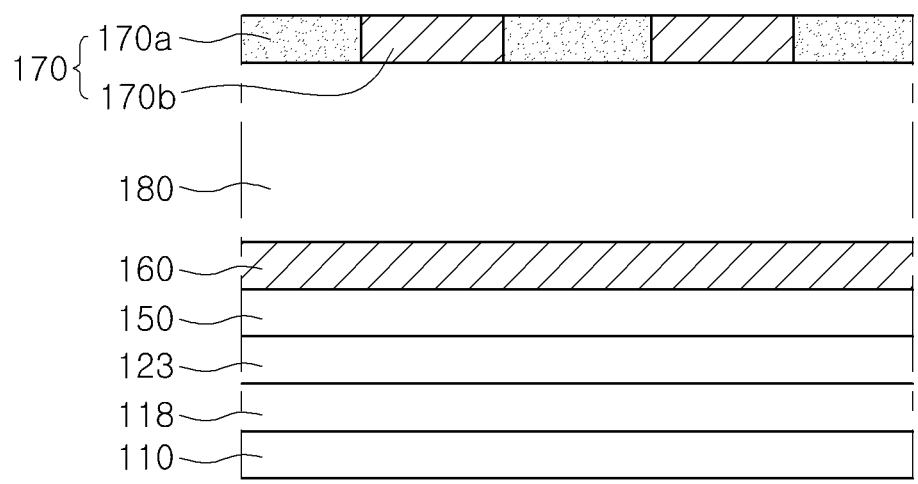

In FIG. 4D, the photoresist patterns 130 of FIG. 4C are removed through a stripping process.

Through the processes, the first portions 170a of the second electrode 170 still have an oxide semiconductor property, and the second portions 170b of the second electrode 170 have a conductor property. The second portions 170b of the second electrode 170 and the first electrode 160 induce a fringe field therebetween such that liquid crystal molecules are driven by the fringe field.

Therefore, it is possible to form the second electrode 170 having a plate shape without any pattern.

Figure 4E:
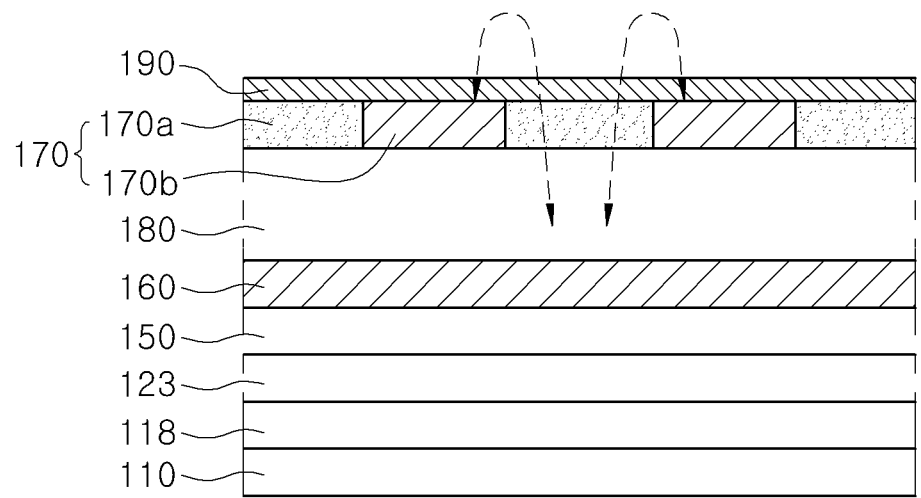

In FIG. 4E, the first alignment layer 190 is formed on the second electrode 170.

Figure 4F:
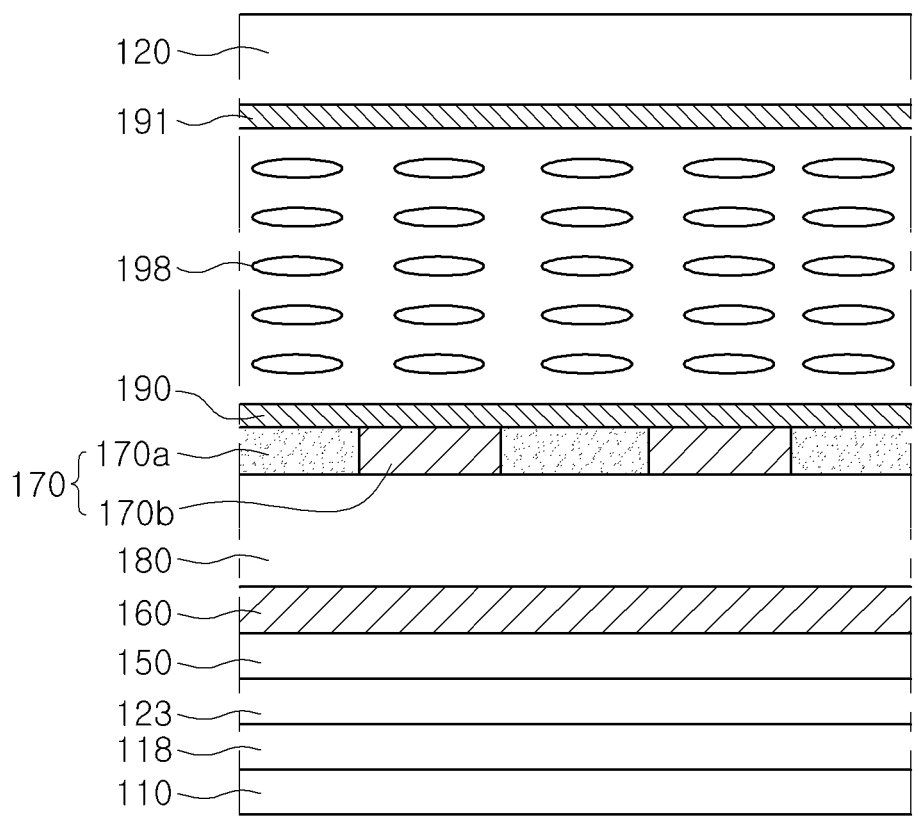

In FIG. 4F, the second substrate 120 having the second alignment layer 191 is disposed over the first substrate 110 such that the second alignment layer 191 faces the first alignment layer 190. The liquid crystal molecules 198 are disposed between the first alignment layer 190 and the second alignment layer 191.

The first alignment layer 190 may be formed by forming a polymer thin film and orienting its surface in a predetermined direction.

An organic material such as polyimide may be used for the first alignment layer 190, and the material for the first alignment layer 190 is not limited to this.

A rubbing method or a UV irradiating method, not limited to theses, may be used to orient the surface of the first alignment layer 190.

For example, the rubbing method may be used. More specifically, an organic material of polyimide may be applied on a substrate, a solvent may be removed at a temperature of 60 to 80° C., the organic material may be hardened at a temperature of 80 to 200° C., thereby forming the first alignment layer 190, and the first alignment layer 190 may be rubbed by a rubbing cloth such as velvet in a predetermined direction.

The rubbing method is easy and stable for orientation of an alignment layer and is appropriate for mass production.

Particularly, since the first alignment layer 190 is formed on the second electrode 170 having a flat surface, the first alignment layer 190 does not have a step height d similar to the one shown in FIG. 2E. Thus, the surface of the first alignment layer 190 can be more uniformly oriented, and the orientation problem of the first alignment layer 190 is reduced.

Accordingly, the liquid crystal molecules 198 between the first and second alignment layers 190 and 191 are regularly arranged in a predetermined direction.

The surface of the second alignment layer 191 also may be oriented by the rubbing method or the UV irradiating method.

As mentioned above, in the LCD device 200 according to the first embodiment, the first electrode 160 is formed of ITO and has a plate shape. The second electrode 170 is formed of IGZO and has a plate shape, and the second portions 170b of the second electrode 170 are plasma-treated to have a conductor property. The fringe field is generated between the first electrode 160 and the second portions 170b of the second electrode 170 when a voltage is applied.

The first alignment layer 190 on the second electrode 170 does not have a step height d similar to the one shown in FIG. 2E, and the liquid crystal molecules 198 are regularly arranged in the predetermined direction. Accordingly, the afterimage of the LCD device 200 can be effectively improved.

Figure 5:
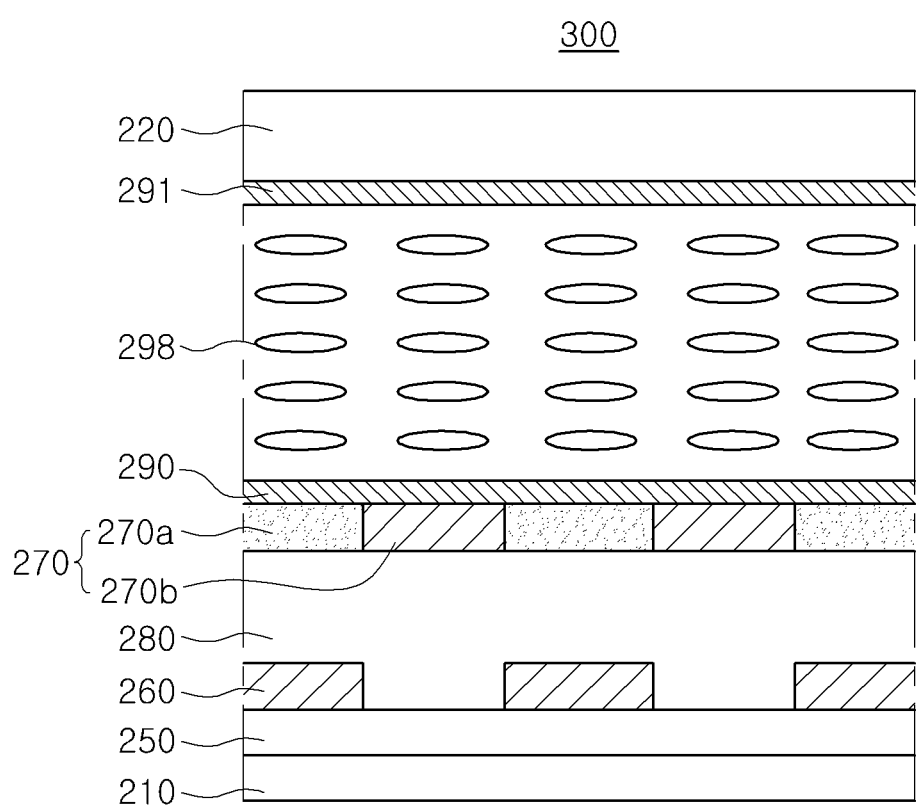
FIG. 5 is a schematic cross-sectional view of an LCD device according to a second embodiment.

FIG. 5 is a schematic cross-sectional view of an LCD device according to a second embodiment. The LCD device according to the second embodiment has substantially the same structure as the first embodiment except the first electrode. For convenience, detailed explanation will be omitted or shortened for the same or similar parts.

In FIG. 5, the LCD device 300 according to the second embodiment of the present invention includes a first electrode 260 having bar-shaped patterns and a second electrode 270 having a plate shape without any particular pattern.

Namely, since the second electrode 270 has a flat plate shape without any pattern, a first alignment layer 290 on the second electrode 270 does not have a step height d similar to the one shown in FIG. 2E.

Therefore, the light leakage and afterimage, which are caused by the step height d of the alignment layer 90 in FIG. 2E, can be effectively improved.

A first passivation layer 250 is formed on a first substrate 210, and the first electrode 260 is formed on the first passivation layer 250. The first electrode 260 includes bar-shaped patterns. A second passivation layer 280 is formed on the first electrode 260.

In addition, the second electrode 270 having a plate shape is formed on the second passivation layer 280.

In more detail, the first electrode 260 may be formed of a transparent conductive material. For example, the first electrode 260 may be formed of indium tin oxide (ITO) or indium zinc oxide (IZO).

That is, the first electrode 260 may be formed on the first passivation layer 250 by depositing a transparent conductive material such as ITO or IZO over the first passivation layer 250 to thereby form a transparent conductive layer and then patterning the transparent conductive layer.

In addition, the second passivation layer 280 on the first electrode 260 may be formed by depositing an inorganic insulating material such as silicon oxide ($SiO_2$) or silicon nitride (SiNx), for example, or by applying an organic insulating material such as photo acryl, for example.

The second electrode 270 may be formed of transparent indium gallium zinc oxide (IGZO).

The IGZO is an oxide semiconductor. The IGZO may include a 1:1:1:3 mix of indium, gallium, zinc and oxygen, and the IGZO is not limited to this.

The second electrode 270 may be formed on the second passivation layer 280 by depositing IGZO using a RF and DC magnetron sputtering method, a molecular beam epitaxy (MBE) method, a chemical vapor deposition (CVD) method, or a pulse laser deposition (PLD) method.

The sputtering method has the advantage that a film having a high quality can be easily formed at a relatively low temperature. Furthermore, it is easier to deposit a film for a relatively large area compared to other methods.

A photoresist layer (not shown in FIG. 5) may be formed on a layer for the second electrode 270 and may be patterned through a photolithographic process to thereby form photoresist patterns 130 similar to the ones shown in FIG. 4C on the layer for the second electrode 270.

The photoresist patterns 130 may selectively cover portions of the layer for the second electrode 270 and selectively expose the other portions of the layer for the second electrode 270.

Plasma treatment may be performed to the layer for the second electrode 270 on which the photoresist patterns 130 such that the exposed portions of the layer of the second electrode 270 may become a conductor, thereby forming the second electrode 270 including first portions 270a and second portions 270b.

In the second portions 270b of the second electrode 270 formed of IGZO, oxygen vacancies may be formed by ion impacts through the plasma treatment, and the oxygen vacancies may function as dopants. Thus, the resistance of the second portions 270b of the second electrode 270 may decrease, and the second portions 270b of the second electrode 270 may have a conductor property.

That is, the oxygen vacancies may be generated during the plasma treatment process, the number of free electrons may increase, and the conductivity of the second portions 270b of the second electrode 270 may increase.

Argon (Ar), helium (He) or hydrogen (H2) may be used for the plasma treatment, and the gas for the plasma treatment is not limited to these.

The first portions 270a and the second portions 270b may have a bar shape and may alternate each other. However, the first and second portions 270a and 270b are not limited to this.

Moreover, the second portions 270b of the second electrode 270 may correspond to openings between the bar-shaped patterns of the first electrode 260. The first portions 270a of the second electrode 270 may correspond to the bar-shaped patterns of the first electrode 260.

Here, the photoresist patterns 130 may cover the first portions 270a and expose the second portions 270b.

The photoresist patterns 130 may be removed through a stripping process.

Through the processes, the first portions 270a of the second electrode 270 still may have an oxide semiconductor property, and the second portions 270b of the second electrode 270 may have a conductor property. The second portions 270b of the second electrode 270 may correspond to the openings between the bar-shaped patterns of the first electrode 260, and the second portions 270b of the second electrode 270 and the first electrode 260 may induce a horizontal electric field therebetween such that liquid crystal molecules 298 are driven by the horizontal electric field, which is substantially parallel to the first and second substrate 210 and 220.

Particularly, it is possible to form the first electrode 260 having the bar-shaped patterns with the openings therebetween and the second electrode having a plate shape without any pattern.

Therefore, the second electrode 270 having a plate shape without any pattern can be formed.

In addition, as stated above, the first alignment layer 290 is formed on the second electrode 270.

The first alignment layer 290 may be formed by forming a polymer thin film and orienting its surface in a predetermined direction.

An organic material such as polyimide may be used for the first alignment layer 290, and the material for the first alignment layer 290 is not limited to this.

A rubbing method, not limited to this, may be used to orient the surface of the first alignment layer 290.

For example, according to the method, an organic material of polyimide may be applied on a substrate, a solvent may be removed at a temperature of 60 to 80° C., the organic material may be hardened at a temperature of 80 to 200° C., thereby forming the first alignment layer 290, and the first alignment layer 290 may be rubbed by a rubbing cloth such as velvet in a predetermined direction.

The rubbing method is easy and stable for orientation of an alignment layer and is appropriate for mass production.

Particularly, since the first alignment layer 290 is formed on the second electrode 270 having a flat surface, the first alignment layer 290 does not have a step height d similar to the one shown in FIG. 2E. Thus, the surface of the first alignment layer 290 can be more uniformly oriented, and the orientation problem of the first alignment layer 290 may be reduced.

The first substrate 210 and a second substrate 220 facing the first substrate 210 are attached to each other with liquid crystal molecules 298 interposed therebetween to thereby complete an IPS mode LCD device 300.

Accordingly, the liquid crystal molecules 298 between the first alignment layer 290 and a second alignment layer 291 are regularly arranged in a predetermined direction.

As mentioned above, in the LCD device 300 according to the second embodiment, the first electrode 260 has bar-shaped patterns. The second electrode 270 is formed of IGZO and has a plate shape. The second portions 270b of the second electrode 270 are plasma-treated to have a conductor property. The bar-shaped patterns of the first electrode 260 and the second portions 270b of the second electrode 270 are alternately arranged to generate a horizontal electric field which is parallel to the first and second substrates 210 and 220 when a voltage is applied. The liquid crystal molecules 298 are driven by the horizontal electric field.

The first alignment layer 290 on the second electrode 270 does not have a step height d similar to the one shown in FIG. 2E, and the liquid crystal molecules 298 are regularly arranged in the predetermined direction. Accordingly, the light leakage and afterimage of the LCD device 300 can be effectively improved.

Figure 6:
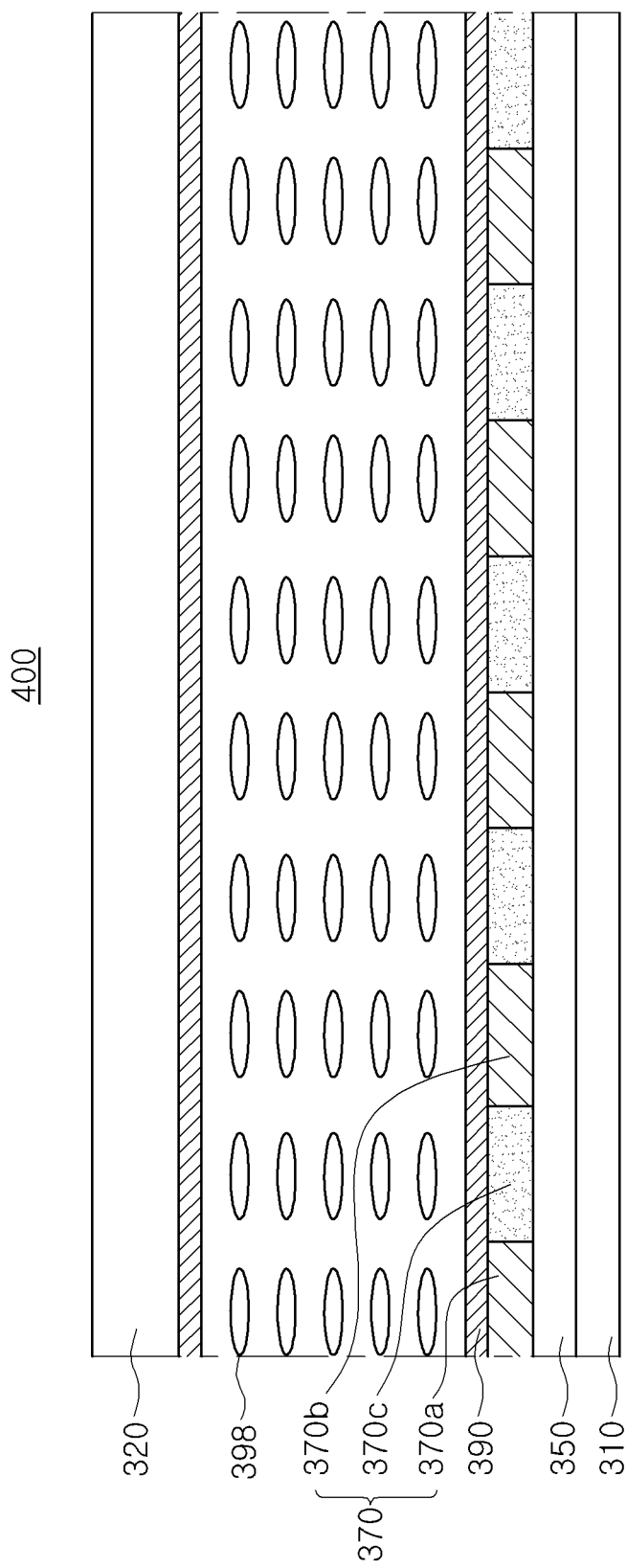
FIG. 6 is a schematic cross-sectional view of an LCD device according to a third embodiment.

FIG. 6 is a schematic cross-sectional view of an LCD device according to a third embodiment. The LCD device according to the third embodiment has substantially the same structure as the first embodiment except the first electrode and the second electrode. For convenience, detailed explanation will be omitted or shortened for the same or similar parts.

In FIG. 6, the LCD device 400 according to the third embodiment of the present invention includes a single electrode layer 370 having a plate shape and including a first electrode 370a and a second electrode 370b.

Namely, since the single electrode layer 370 includes first portions 370a of the first electrode and second portions 370b of the second electrode which alternate each other, a first alignment layer 390 on the single electrode layer 370 does not have a step height d similar to the one shown in FIG. 2E.

Therefore, the light leakage and afterimage, which are caused by the step height d of the alignment layer 90 in FIG. 2E, can be effectively improved.

A passivation layer 350 is formed on a first substrate 310, and the single electrode layer 370 having a plate shape is formed on the passivation layer 350.

In more detail, the passivation layer 350 may be formed by depositing an inorganic insulating material such as silicon oxide ($SiO_2$) or silicon nitride (SiNx), for example, or by applying an organic insulating material such as photo acryl, for example.

The single electrode layer 370 on the passivation layer 350 may be formed of transparent indium gallium zinc oxide (IGZO).

The IGZO is an oxide semiconductor. The IGZO may include a 1:1:1:3 mix of indium, gallium, zinc and oxygen, and the IGZO is not limited to this.

The single electrode layer 370 may be formed on the passivation layer 350 by depositing IGZO using a RF and DC magnetron sputtering method, a molecular beam epitaxy (MBE) method, a chemical vapor deposition (CVD) method, or a pulse laser deposition (PLD) method.

The sputtering method has the advantage that a film having a high quality can be easily formed at a relatively low temperature. Furthermore, it is easier to deposit a film for a relatively large area compared to other methods.

A photoresist layer may be formed on the single electrode layer 370 and may be patterned through a photolithographic process to thereby form photoresist patterns 130 similar to the one shown in FIG. 4C on the single electrode layer 370.

More particularly, the photoresist patterns 130 may selectively cover portions of the single electrode layer 370 and selectively expose the other portions of the single electrode layer 370.

Plasma treatment may be performed to the single electrode layer 370 on which the photoresist patterns 130 such that the exposed portions of the single electrode layer 370 may become a conductor, thereby forming the first portions 370a and the second portions 370b.

In the first and second portions 370a and 370b of the single electrode layer 370 formed of IGZO, oxygen vacancies may be formed by ion impacts through the plasma treatment, and the oxygen vacancies may function as dopants. Thus, the resistance of the first and second portions 370a and 370b of the single electrode layer 370 may decrease, and the first and second portions 370a and 370b of the single electrode layer 370 may have a conductor property.

That is, the oxygen vacancies may be generated during the plasma treatment process, the number of free electrons may increase, and the conductivity of the first and second portions 370a and 370b of the single electrode layer 370 may increase.

Argon (Ar), helium (He) or hydrogen (H2) may be used for the plasma treatment, and the gas for the plasma treatment is not limited to these.

Therefore, the single electrode layer 370 includes first, second and third portions 370a, 370b and 370c. The first portions 370a and the second portions 370b may have a bar shape and may alternate each other. Each of the third portions 370c is disposed between adjacent first and second portions 370a and 370b. However, the first, second and third portions 370a, 370b and 370c are not limited to this.

For example, the first portion 370a, the third portion 370c, the second portion 370b, the third portion 370c, the first portion 370a, the third portion 370c, and so on may be sequentially arranged, and the order is not limited on this.

The first and second portions 370a and 370b of the single electrode layer 370 may have a conductor property and the third portions 370c of the single electrode layer 370 may have an oxide semiconductor property.

Here, the photoresist patterns 130 may cover the third portions 370c of the single electrode layer 370 and expose the first and second portions 370a and 370b of the single electrode layer 370.

The photoresist patterns 130 may be removed through a stripping process.

Through the processes, the third portions 370c of the single electrode layer 370 still may have an oxide semiconductor property, and the first and second portions 370a and 370b of the single electrode 370 may have a conductor property. The first and second portions 370a and 370b of the single electrode layer 370 may function as the first and second electrodes, respectively.

For example, ones of the first and second portions 370a and 370b may be a pixel electrode which is connected to a thin film transistor, and the others of the first and second portions 370a and 370b may be a common electrode which is connected to a common line.

Therefore, the first electrode corresponding to the first portions 370a of the single electrode layer 370 and the second electrode corresponding to the second portions 370b of the single electrode layer 370b may induce a horizontal electric field therebetween such that liquid crystal molecules 398 are driven by the horizontal electric field, which is substantially parallel to the first and second substrate 310 and 320.

In addition, the first alignment layer 390 is formed on the single electrode layer 370 having a plate shape and including the first and second electrodes 370a and 370b.

The first substrate 310 having the single electrode layer 370 and a second substrate 320 facing the first substrate 310 are attached to each other with liquid crystal molecules 398 interposed therebetween to thereby complete an IPS mode LCD device 400.

As mentioned above, in the LCD device 400 according to the third embodiment, the single electrode layer 370 is formed of IGZO and has a plate shape, and the first and second portions 370a and 370b, which function as the first and second electrodes, are plasma-treated to have a conductor property. The first and second portions 370a and 370b are alternately arranged with the third portions 370c therebetween to generate a horizontal electric field which is parallel to the first and second substrates 310 and 320 when a voltage is applied. The liquid crystal molecules 298 may be driven by the electric field.

The first alignment layer 390 on the single electrode layer 370 does not have a step height d of FIG. 2E, and the liquid crystal molecules 398 are regularly arranged in the predetermined direction. Accordingly, the light leakage and afterimage of the LCD device 400 can be effectively improved.

Figure 7:
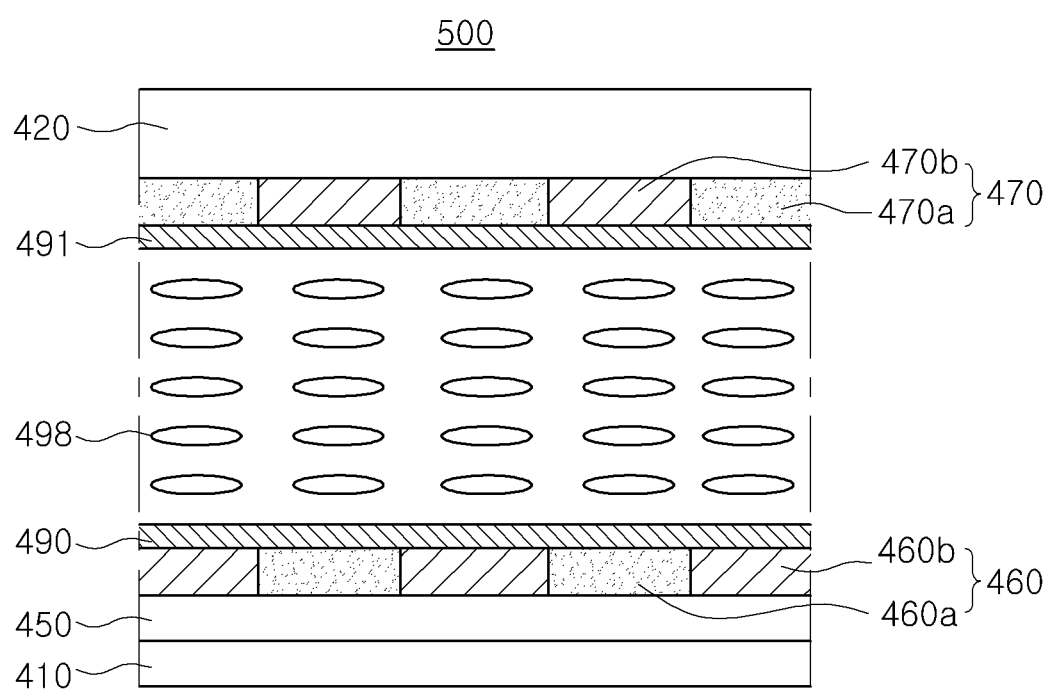
FIG. 7 is a schematic cross-sectional view of an LCD device according to a fourth embodiment.

FIG. 7 is a schematic cross-sectional view of an LCD device according to a fourth embodiment. The LCD device according to the fourth embodiment has substantially the same structure as the first embodiment except the first electrode and the second electrode. For convenience, detailed explanation will be omitted or shortened for the same or similar parts.

In FIG. 7, the LCD device 500 according to the fourth embodiment of the present invention includes a first substrate 410, a second substrate 420 facing the first substrate 410, a first electrode 460 on an inner surface of the first substrate 410, a second electrode 470 on an inner surface of the second substrate 420, and liquid crystal molecules 498 between the first electrode 460 and the second electrode 470. A passivation layer 450 is formed between the first electrode 460 and the first substrate 410.

The first electrode 460 and the second electrode 470 each have a plate shape without any particular pattern.

Namely, since the first electrode 460 and the second electrode 470 have flat top and bottom surfaces without patterns, respectively, each of a first alignment layer 490 on the first electrode 460 and a second alignment layer 491 on the second electrode 470 does not have a step height d similar to the one shown in FIG. 2E.

Therefore, the light leakage and afterimage, which are caused by the step height d of the alignment layer 90 in FIG. 2E, can be effectively improved.

In more detail, the first and second electrodes 460 and 470 may be formed of transparent indium gallium zinc oxide (IGZO).

The IGZO is an oxide semiconductor. The IGZO may include a 1:1:1:3 mix of indium, gallium, zinc and oxygen, and the IGZO is not limited to this.

The first electrode 460 may include first portions 460a and second portions 460b, and second electrode 470 may include first portions 470a and second portions 470b. To increase the viewing angles, the first portions 460a of the first electrode 460 may be positioned to correspond to the second portions 470b of the second electrode 470, and the second portions 460b of the first electrode 460 may be positioned to correspond to the first portions 470a of the second electrode 470, as illustrated in FIG. 7.

Alternatively in other embodiments, the first portions 460a of the first electrode 460 may be positioned to correspond to the first portions 470a of the second electrode 470, and the second portions 460b of the first electrode 460 may be positioned to correspond to the second portions 470b of the second electrode 470.

In addition, the first portions 460a and 470a and the second portions 460b and 470b may be alternately arranged, and are not limited to this.

Similar to the photoresist patterns 130 shown in FIG. 4C, photoresist patterns 130 may be formed on each of the first and second electrodes 460 and 470, and the photoresist patterns 130 may selectively cover ones of the first portions 460a and 470a and ones of the second portions 460b and 470b of the first and second electrodes 460 and 470 and selectively expose the others.

For instance, the photoresist patterns 130 may selectively cover the first portions 460a and 470a of the first and second electrodes 460 and 470 and selectively expose the second portions 460b and 470b of the first and second electrodes 460 and 470.

Plasma treatment may be performed to the first and second electrodes 460 and 470 on which the photoresist patterns 130 such that the exposed second portions 460b and 470b of the first and second electrodes 460 and 470 may become a conductor.

In the second portions 460b and 470b of the first and second electrodes 460 and 470 formed of IGZO, oxygen vacancies may be formed by ion impacts through the plasma treatment, and the oxygen vacancies may function as dopants. Thus, the resistance of the second portions 460b and 470b of the first and second electrodes 460 and 470 may decrease, and the second portions 460b and 470b of the first and second electrodes 460 and 470 may have a conductor property.

That is, the oxygen vacancies may be generated during the plasma treatment process, the number of free electrons may increase, and the conductivity of the second portions 460b and 470b of the first and second electrodes 460 and 470 may increase.

Argon (Ar), helium (He) or hydrogen (H2) may be used for the plasma treatment, and the gas for the plasma treatment is not limited to these.

The photoresist patterns 130 may be removed through a stripping process.

Through the processes, the first portions 460a and 470a of the first and second electrodes 460 and 470 still may have an oxide semiconductor property, and the second portions 460b and 470b of the first and second electrodes 460 and 470 may have a conductor property. The second portions 460b of the first electrode 460 and the second portions 470b of the second electrode 470 may induce a vertical electric field therebetween such that liquid crystal molecules 498 are driven by the vertical electric field, which is substantially perpendicular to the first and second substrates 410 and 420.

Particularly, the first and second electrodes 460 and 470 each have a plate shape without patterns.

As mentioned above, the first and second alignment layers 490 and 491 are formed on the first and second electrodes 460 and 470, respectively.

Since the first and second electrodes 460 and 470 have flat surfaces, the first and the second alignment layers 490 and 491 do not have a step height d similar to the one shown in FIG. 2E. Thus, surfaces of the first and second electrodes 460 and 470 are uniformly oriented.

Therefore, the liquid crystal molecules 498 on the first and second alignment layers 490 and 491 are regularly arranged in the predetermined direction.

As stated above, in the LCD device 500 according to the fourth embodiment, the first and second electrodes 460 and 470 are formed of IGZO and have a plate shape. The second portions 460 and 470b of the first and second electrodes 460 and 470 are plasma-treated to have a conductor property. The second portions 460 and 470b of the first and second electrodes 460 and 470 are alternated arranged to generate a vertical electric field which is perpendicular to the first and second substrates 410 and 420 when a voltage is applied.

Since the first and second alignment layers 490 and 491 on the first and second electrodes 460 and 470 do not have a step height d of FIG. 2E, the liquid crystal molecules 498 are regularly arranged in the predetermined direction. Accordingly, the light leakage and afterimage of the LCD device 500 can be effectively improved.

In the LCD device of the present disclosure, the electrode is formed to partially be a conductor, and the alignment layer is formed on the electrode without a step height.

Therefore, the light leakage and afterimage due to the step height of the alignment layer can be effectively improved. In addition, the LCD device improving the afterimage can be provided without an increase in manufacturing processes as compared with the related art.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device comprising:
    a first substrate;
    a thin film transistor on the first substrate having a source electrode and a drain electrode;
    a first passivation layer on the thin film transistor;
    a first electrode on the first passivation layer;
    a second passivation layer on the first electrode;
    a second electrode of an oxide semiconductor on the second passivation layer connected to the source electrode or the drain electrode of the thin film transistor, the second electrode having first portions and second portions, the second portions being conductive, the first portions having an electrical resistance higher than the second portions and having a same height as the second portions; and
    an alignment layer on the second electrode, wherein the alignment layer contacts top surfaces of the first portions and the second portions flush with each other.

2. The liquid crystal display device of claim 1, wherein the second electrode is formed of indium gallium zinc oxide (IGZO) and has a plate shape.

3. The liquid crystal display device of claim 2, wherein the first portions are bar-shaped and spaced apart from each other.

4. The liquid crystal display device of claim 3, wherein the first electrode is formed of indium tin oxide (ITO) and has a plate shape.

5. The liquid crystal display device of claim 3, wherein the first electrode is formed of indium tin oxide (ITO) and includes bar-shaped patterns.

6. The liquid crystal display device of claim 5, wherein openings between the bar-shaped patterns correspond to the second portions.

7. A liquid crystal display device comprising:
    a first substrate;
    a thin film transistor on the first substrate, the thin film transistor having a source electrode and a drain electrode;
    a passivation layer on the thin film transistor;
    an electrode layer of an oxide semiconductor on the passivation layer; and
    an alignment layer on the electrode layer,
    wherein the electrode layer includes a first conductive portion connected to the source electrode or the drain electrode, a second conductive portion and a third portion, and the third portion disposed between the first and second conductive portions, the first conductive portion, second conductive portion, and third portion having an electrical resistance higher than the first conductive portion and the second conductive portion, and having a same height as the first conductive portion and the second conductive portion, and
    wherein the alignment layer contacts top surfaces of the first conductive portion, second conductive portion, and third conductive portion flush with each other.

8. The liquid crystal display device of claim 7, wherein the electrode layer is formed of indium gallium zinc oxide (IGZO) and has a plate shape.

9. The liquid crystal display device of claim 8, wherein the first, the second and the third portions are bar-shaped.

10. A liquid crystal display device comprising:
    a first substrate and a second substrate facing each other;
    a thin film transistor on an inner surface of the first substrate, the thin film transistor having a source electrode and a drain electrode;
    a passivation layer on the thin film transistor;
    a first electrode of an oxide semiconductor on the passivation layer, the first electrode including first portions and second conductive portions, the first electrode connected to the source electrode or the drain electrode;
    a first alignment layer on the first electrode;
    a second electrode of an oxide semiconductor on an inner surface of the second substrate, the second electrode including first portions and second conductive portions, the first portions of the second electrode having an electrical resistance higher than the second conductive portions and having a same height as the second conductive portions of the second electrode;
    a second alignment layer on the second electrode; and
    a liquid crystal layer between the first and second alignment layers,
    wherein the second alignment layer contacts top surfaces of the first portions and the second conductive portions flush with each other.

11. The liquid crystal display device of claim 10, wherein the first and second electrodes are formed of indium gallium zinc oxide (IGZO) and have a plate shape.

12. The liquid crystal display device of claim 11, wherein the first portions of the first and second electrodes are bar-shaped and spaced apart from each other.

13. The liquid crystal display device of claim 12, wherein the first portions of the first electrode are positioned to correspond to the second portions of the second electrode, and the second portions of the first electrode are positioned to correspond to the first portions of the second electrode.

14. The liquid crystal display device of claim 12, wherein the first portions of the first electrode are positioned to correspond to the first portions of the second electrode, and the second portions of the first electrode are positioned to correspond to the second portions of the second electrode.

15. A liquid crystal display device comprising:
a first electrode on a substrate;
a thin film transistor having a source electrode and a drain electrode;
an insulating layer disposed on the first electrode;
a second electrode of semiconductor material disposed on the insulating layer, the second electrode comprising:
a plurality of first conductive portions connected to the source electrode or the drain electrode, and
a plurality of second portions, the second portions having a lower electrical conductivity than the first conductive portions, the first conductive portions alternately arranged with the second portions, and a top surface of the first conductive portions flush with a top surface of the second portions; and
an alignment layer on the second electrode, wherein the alignment layer contacts the top surfaces of the first conductive portions and the second portions.

16. The liquid crystal display device of claim 15, wherein the second electrode is made of indium gallium zinc oxide (IGZO), and wherein the first conductive portions of the second electrode are formed of IGZO having an oxygen concentration higher than the second portions of the second electrode.

17. The liquid crystal display device of claim 15, wherein the plurality of first conductive portions of the second electrode are bar-shaped and spaced apart from each other separated by the second portions of the second electrode.

18. A method of manufacturing a display device comprising:
depositing a transparent conductive layer on a substrate;
depositing an insulating layer on the substrate;
depositing a transparent semiconductor layer on the substrate connected to a source electrode or a drain electrode of a thin film transistor;
depositing a photoresist on the transparent semiconductor layer;
patterning the photoresist to have a plurality of openings;
plasma treating portions of the transparent semiconductor layer that are underneath the plurality of openings of the patterned photoresist to increase conductivity of the treated portions, thereby forming an electrode having first portions and second portions, the second portions corresponding to the treated portions and being conductive, the first portions having an electrical resistance higher than the second portions and having a same height as the second portions; and
removing the photoresist.

19. The method of claim 18, wherein the plasma treating increases oxygen concentration of the treated semiconductor layer.

20. The method of claim 18, wherein a surface of the transparent semiconductor layer is substantially flat.

21. The liquid crystal display device of claim 1, wherein the second electrode is formed by:
depositing a transparent semiconductor layer on the second passivation layer;
depositing a photoresist on the transparent semiconductor layer;
patterning the photoresist to have a plurality of openings;
plasma treating portions of the transparent semiconductor layer that are underneath the plurality of openings of the patterned photoresist to increase conductivity of the treated portions; and
removing the photoresist.

* * * * *